(12) United States Patent
Wu et al.

(10) Patent No.: US 7,170,927 B2
(45) Date of Patent: Jan. 30, 2007

(54) METHODS AND APPARATUS FOR AN ADSL TRANSCEIVER

(75) Inventors: Zhonghua Wu, Tucson, AZ (US); Craig R Teeple, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 796 days.

(21) Appl. No.: 10/222,499

(22) Filed: Aug. 16, 2002

(65) Prior Publication Data
US 2004/0032911 A1    Feb. 19, 2004

(51) Int. Cl.
*H04M 9/08* (2006.01)
(52) U.S. Cl. .................. 375/222; 375/260; 379/406.01
(58) Field of Classification Search ................ 375/219, 375/222, 259, 260; 379/406.01, 406.05
See application file for complete search history.

(56) References Cited

U.S. PATENT DOCUMENTS

| 4,339,668 | A | * | 7/1982 | Mueller et al. ............. 307/149 |
| 4,645,883 | A | * | 2/1987 | Horna et al. ............ 379/406.08 |
| 5,181,228 | A | * | 1/1993 | Takatori ..................... 375/350 |
| 6,658,055 | B1 | * | 12/2003 | Darr ........................... 375/232 |
| 6,956,944 | B1 | * | 10/2005 | Koren .................... 379/406.01 |
| 2003/0031139 | A1 | * | 2/2003 | Thilenius ..................... 370/286 |

* cited by examiner

*Primary Examiner*—Jay K. Patel
*Assistant Examiner*—David B. Lugo
(74) *Attorney, Agent, or Firm*—Steven A. Shaw; W. James Brady; Frederick J. Telecky, Jr.

(57) ABSTRACT

An ADSL transceiver hybrid circuit uses one or more isolated couplers (optical couplers, capacitors, or the like) configured to minimize the transmit signal component in the receive signal path by providing an isolated transmit signal feedback, thereby providing echo cancellation, isolating the telephone loop from the analog front end, and eliminating the need for a complex high-pass filter. The ADSL transceiver provides isolation and echo cancellation by: (a) generating a signal within the analog loop (e.g., telephone loop, or "local loop") corresponding to a differential transmit signal; (b) receiving a composite signal from the analog loop corresponding to the sum of the transmit signal generated on the analog loop and the receive signal; (c) producing an isolated transmit signal (e.g., through the use of an optocoupler, capacitor, transformer, or the like); (d) inverting the isolated transmit signal to produce an inverted isolated transmit signal; and (e) producing the differential receive signal based on the sum of the inverted isolated transmit signal and the composite signal.

12 Claims, 2 Drawing Sheets

METHODS AND APPARATUS FOR AN ADSL TRANSCEIVER

BACKGROUND OF THE INVENTION

1. Technical Field

The present invention relates, generally, to asymmetrical digital subscriber line (ADSL) systems and, more particularly, to an improved hybrid circuit for use in connection with ADSL data communication.

2. Background Information

Due in part to the widespread popularity of the Internet, consumers and Internet Service Providers (ISPs) continue to seek improved, higher-bandwidth methods of providing data communication. In this regard, a great amount of interest has been generated by Asymmetric Digital Subscriber Line (ADSL) systems. In general, ADSL technology involves the use of modem systems configured to communicate over a conventional twisted-pair copper line (often referred to as the "last mile") to provide, in addition to traditional voice telephone service, approximately 1.5 to 8.0 Mbps data transmission downstream (i.e., to the subscriber), and about 16 to 640 Kbps data transmission upstream (i.e., to an Internet service provider (ISP) or other data network).

ADSL is one of a family of acronyms based on digital subscriber lines (DSL), including, for example, SDSL (symmetric digital subscriber line), RADSL (rate adaptive ADSL), HDSL (high data rate digital subscriber line), and VDSL (very high data rate digital subscriber line). This DSL class of technology is sometimes generally referred to as "xDSL." Thus, while the acronym "ADSL" will be used throughout this application, it should be appreciated that this is not intended as a limitation on potential applications.

Currently known ADSL systems are unsatisfactory in a number of respects. For example, conventional ADSL transceivers include a hybrid circuit which essentially functions as an electrical bridge whose impedance is configured to match, as close as possible, the telephone loop impedance. However, as the impedance of the telephone loop is not precisely fixed, it is impossible to design the bridge such that its impedance matches all possible environments in which it is likely to be deployed. As a result of this impedance mismatch, there is always a significant echo return loss through the hybrid circuit. For example, it is not unusual for conventional hybrid circuits to experience an echo return loss of between about 20 dB and 40 dB.

Furthermore, currently known hybrid circuits are unsatisfactory in that they necessarily incorporate a high-pass filter designed to implement frequency-division multiplexing of the upstream and downstream signals. This filter, which may be a 5th order or 7th order filter, includes a large number of components and therefore greatly increases the size and cost of the hybrid circuit. Similarly, such circuits require a large magnetic transformer to provide isolation of the telephone line from the analog front end. In the context of the central office, any circuitry that increases the size of the hybrid is disadvantageous in that space within the central office is a premium.

Methods are therefore needed in order to overcome these and other limitations of the prior art.

BRIEF SUMMARY OF THE INVENTION

The present invention provides systems and methods for an ADSL transceiver hybrid circuit which, through the use of one or more isolated couplers (optical couplers, capacitors, or the like), is configured to minimize the transmit signal component in the receive signal path by providing an isolated transmit signal feedback, thereby providing echo cancellation, isolating the telephone loop from the analog front end, and eliminating the need for a complex high-pass filter.

In accordance with various aspects of the present invention, an ADSL transceiver provides isolation and echo cancellation by: (a) generating a signal within the analog loop (e.g., telephone loop, or "local loop") corresponding to a differential transmit signal; (b) receiving a composite signal from the analog loop corresponding to the sum of the transmit signal generated on the analog loop and the receive signal; (c) producing an isolated transmit signal (e.g., through the use of an opto-coupler, capacitor, transformer, or the like); (d) inverting the isolated transmit signal to produce an inverted isolated transmit signal; and (e) producing the differential receive signal based on the sum of the inverted isolated transmit signal and the composite signal.

In this way, the present invention provides an efficient and compact transceiver hybrid circuit which provides isolation, reduces echo return loss, and eliminates the need for the large and costly high-pass LC filter.

BRIEF DESCRIPTION OF THE DRAWINGS

The subject invention will hereinafter be described in conjunction with the appended drawing figures, wherein like numerals denote like elements, and.

DETAILED DESCRIPTION OF EXEMPLARY EMBODIMENTS

Systems and methods in accordance with the present invention provide an ADSL transceiver hybrid circuit which includes one or more isolated couplers (optical couplers, capacitors, or the like) configured to minimize the transmit signal component in the receive signal path by providing an isolated transmit signal feedback. The resulting circuit is compact, efficient, and serves the required hybrid functions—i.e., echo cancellation and isolation—while at the same time eliminating the need for the complex high-pass filter required in conventional ADSL transceiver hybrids.

The transceiver and hybrid circuit of the present invention may be provided at one or more locations within the ADSL communication path. That is, the transceiver may be placed within the central office (often referred to the "ATU-C" modem in various ADSL specifications) and/or the customer's premises (the "ATU-R" modem). In this regard, those skilled in the art will recognize that a central office or customer-premises DSL modem includes assorted other components and software required to process upstream and downstream ADSL data and to interface with the digital network. For additional information regarding such systems, see, e.g., SUMMERS, ADSL: STANDARDS, IMPLEMENTATION, AND ARCHITECTURE (1999). See also the ANSI TI.413 *ADSL Standard Performance Targets* and the ITU G.992.2 (G.lite), G.992.1 (G.dmt), and G.dmt.bis (Annexes A, B, C, H, I, and J) standard documents, the entire contents of which are hereby incorporated by reference.

Figure 1:
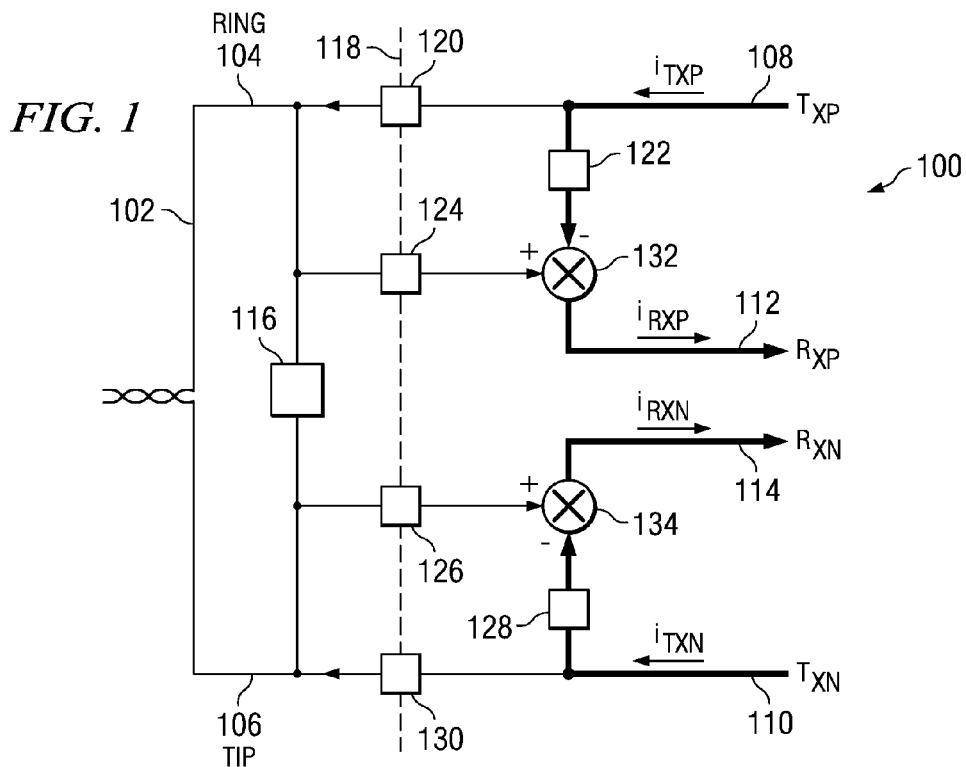
FIG. 1 is a schematic block-diagram overview of a transceiver circuit in accordance with various aspects of the present invention.
Figure 2A:
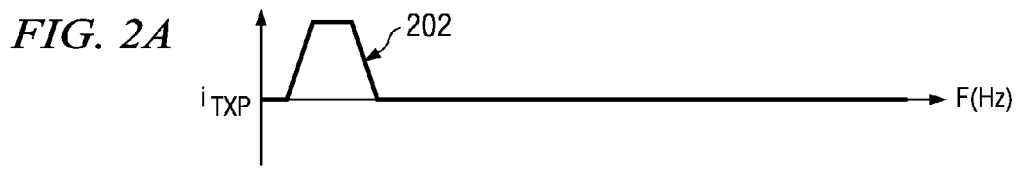
FIGS. 2(*a*)–(*d*) are qualitative frequency diagrams showing the addition and subtraction of various signals produced by the present invention.
Figure 2B:
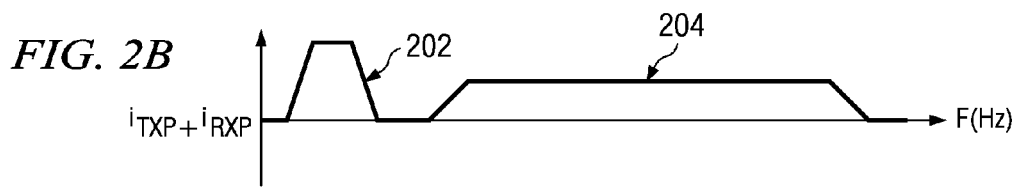
Figure 2C:
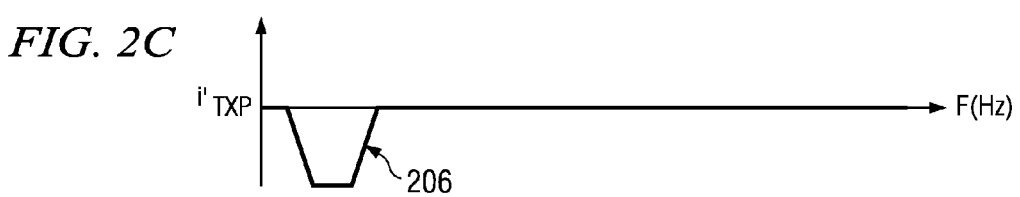
Figure 2D:
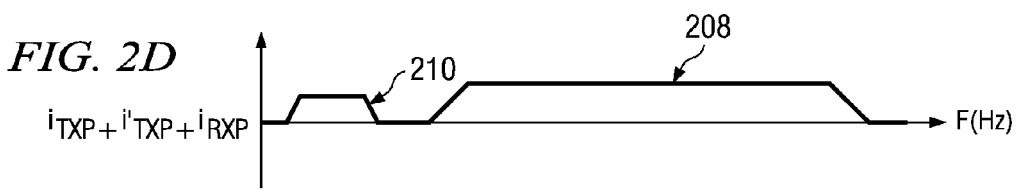

Referring now to the schematic block diagram shown in FIG. 1, a transceiver circuit 100 in accordance with one embodiment of the present invention generally provides an interface between an analog loop ("telephone loop") 102, which has a corresponding "ring" end 104 and "tip" end 106, and differential output currents comprising transmit signals $T_{xp}$ 108 and $T_{xn}$ 110 and receive signals $R_{xp}$ 112 and $R_{xn}$ 114. Transmit signals $T_{xp}$ and $T_{xn}$ correspond to currents $i_{txp}$ and $i_{txn}$ respectively. Similarly, receive signals $R_{xp}$ and $R_{xn}$ correspond to currents $i_{rxp}$ and $i_{rxn}$ respectively. An impedance balancing network 116 (a circuit well known in the art), is preferably used to provide impedance balancing within telephone loop 102. Such circuits are generally implemented using a conventional RC balance network.

Four isolated couplers 120, 124, 126, and 130, form an effective isolation barrier 118 between the differential output currents of an analog front end and loop 102. A pair of isolated couplers 122 and 128 are also provided to isolate $R_{xp}$ from $R_{xp}$, and $T_{xn}$ from $T_{xn}$. A summing node 132 is configured to sum the output of isolated coupler 124 and the inverse of the output of isolated coupler 122. A second summing node 134 is configured to sum the output of isolated coupler 126 and the inverse of the output of isolated coupler 128.

Figure 3:
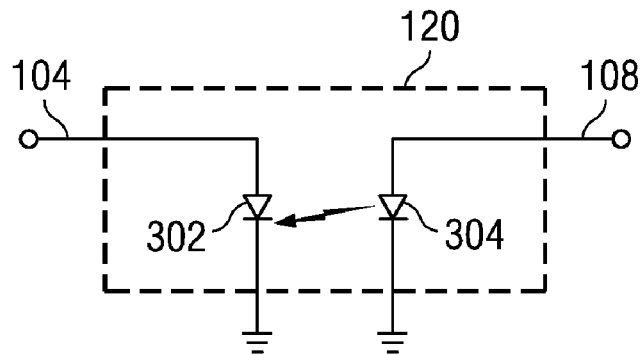
FIG. 3 shows an isolated coupler which includes a light-emitting diode and photodetector in accordance with one embodiment of the present invention.

Isolated couplers 120, 122, 124, 126, 128, and 130 generally provide electrical signal coupling between their respective terminals without employing a direct electrical connection, e.g., without being hard-wired or otherwise linked by a contiguous conductor. In accordance with one embodiment of the present invention, for example, one or more of the isolated couplers (120, 122, 124, 126, 128, and 130) is an opto-coupler, i.e., a component which includes a light-emitting diode (LED) paired with and optically communicating with a corresponding photodetector. FIG. 3, for example, shows an exemplary isolated coupler 120 including an LED 304 coupled to $T_{xp}$ signal 108 and an associated photodetector 302 coupled to loop current 104. Photodetectors may be implemented using, for example, photosensitive transistors, photodiodes, or optically-coupled field-effect transistors (FETs). Optically-coupled FETs are desirable in that they exhibit a high linearity (e.g., with a load current between 0–100 mA) and relatively high speed (e.g., about 10 Mhz). Such photodetectors are known in the art, and thus need not be described in further detail herein.

It will be appreciated that the various opto-couplers may take the form of individual components, integrated chips, multi-chip modules, integrated optic devices, or any other convenient packaging configuration. Furthermore, in accordance one embodiment of the present invention, isolated couplers 120, 124, 126, and 130 are configured such that the photodetectors and LEDS corresponding to each isolated coupler are separated onto two separate but adjacent packages, thereby providing an added level of isolation.

In accordance with one aspect of the present invention, isolated coupler 120 and isolated coupler 122 are opto-couplers sharing a common light-emitting diode coupled to transmit signal 108. In this way, the same amount of light falls on the two photodetectors. Similarly, isolated coupler 128 and isolated coupler 130 may share a common LED coupled to transmit signal 110.

Figure 4:
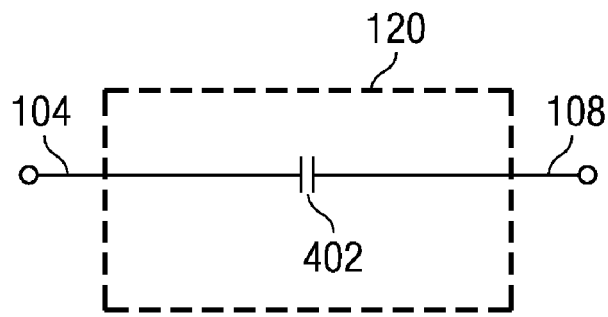
FIG. 4 shows an isolated coupler which includes a capacitor in accordance with another embodiment of the present invention.

In accordance with another embodiment of the present invention, one or more of the isolated couplers is a capacitor as shown in FIG. 4. That is capacitor 402 (which includes two parallel plates of suitable area separated by a dielectric of suitable thickness) is coupled to $T_{xp}$ signal 108 and telephone loop 104. Any convenient capacitor may be used, including, for example, thick-film capacitors, ceramic capacitors, integrated circuit capacitors, and the like. In one embodiment of the present invention, one or more of the isolated couplers are implemented using the substrate (e.g., leadframe, flag, die-bond area, etc.) as one of the capacitor plates.

Figure 5:
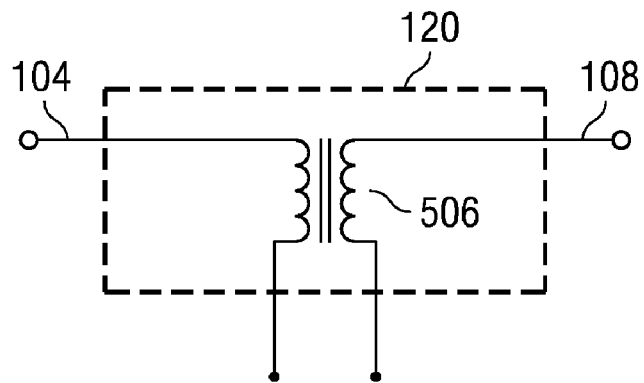
FIG. 5 shows an isolated coupler which includes a transformer in accordance with yet another embodiment of the present invention.

In accordance with another embodiment of the present invention, one or more of the isolated couplers is a transformer as shown in FIG. 5. Transformer 506 may have any suitable winding ratio (e.g., 4:1) depending upon the application. This configuration may be particularly advantageous in implementing isolated couplers 120 and 130.

FIGS. 2(*a*)–(*d*) show qualitative signal diagrams illustrating the function of the various isolated couplers associated with the positive half of the differential signals shown in FIG. 1 (i.e., $T_{xp}$ 108 and $R_{xp}$ 112). It will be appreciated that the description that follows also generally applies to the negative half of the differential signals (i.e., $T_{xn}$ 10 and $R_{xn}$ 114).

As shown in FIG. 2(*a*), a $i_{txp}$ signal 202 (from $T_{xp}$ 108) is generated on ring 104 of loop 102 via isolated coupler 120. As mentioned above, this may be done through the use of, for example, an LED which emits an optical signal received by a photodetector coupled to loop 102.

Isolated coupler 124 then produces a composite current $i_{txp}$ and $i_{rxp}$ (202 and 204) as shown in FIG. 2(*b*). Note that, qualitatively, the $i_{txp}$ current is of a higher amplitude than the $i_{rxp}$ current.

As shown in FIG. 2(*c*), a signal 206 equal to the inverse of $i_{txp}$ (i.e., $i'_{txp}$) is produced through isolated coupler 122. This inversion may be produced in any convenient manner, e.g., through the use of an inverter or other conventional circuitry.

Finally, the signals shown in FIG. 2(*b*) and FIG. 2(*c*) are summed to form a signal $(i_{txp}+i_{rxp})+(-i_{txp})=(i_{txp}+i_{rxp})+(-i'_{txp})$ shown as signal components 208 and 210. To the extent that the absolute values of $i_{txp}$ and $i'_{txp}$ are not equal, the resulting signal component 210 will have a non-zero amplitude (as small as reasonably possible), but will be much smaller than signal component 208.

In this regard, it is preferred that the $i'_{txp}$ and $i'_{txp}$ signals have opposite phases but substantially the same amplitude. Similarly, it is preferred that the $i_{txp}$ and $i'_{txp}$ signals have opposite phases but substantially the same amplitude. It is also desirable to trim the circuit to account for propagation delay in the feedback signal (i.e., from isolated couplers 124 and 126).

The summed signal shown in 2(*d*) corresponds to $R_{xp}$ signal 112 ($i_{rxp}$). Thus, as can be seen in the progression of signals shown in FIG. 2, the $i_{txp}$ component (202) has been substantially removed from the $R_{xp}$ signal path, thus providing a high level of echo cancellation.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A method of providing echo cancellation and isolation in an ADSL transceiver, said ADSL transceiver of the type configured to provide an interface between an analog loop, a transmit signal, and a receive signal, said method comprising:

generating a signal within said analog loop corresponding to said transmit signal;

receiving a composite signal from said analog loop corresponding to the sum of said transmit signal generated on said analog loop and said receive signal;

producing an isolated transmit signal using an isolated coupler comprising a photodiode and a photodetector;

inverting said isolated transmit signal to produce an inverted isolated transmit signal; and producing said receive signal based on the sum of said inverted isolated transmit signal and said composite signal.

2. A method of providing echo cancellation and isolation in an ADSL transceiver, said ADSL transceiver of the type configured to provide an interface between an analog loop, a transmit signal, and a receive signal, said method comprising:

generating a signal within said analog loop corresponding to said transmit signal;

receiving a composite signal from said analog loop corresponding to the sum of said transmit signal generated on said analog loop and said receive signal;

producing an isolated transmit signal using an isolated coupler comprising a transformer;

inverting said isolated transmit signal to produce an inverted isolated transmit signal; and producing said receive signal based on the sum of said inverted isolated transmit signal and said composite signal.

3. An ADSL transceiver of the type configured to provide an interface between an analog loop, a transmit signal, and a receive signal, said transceiver comprising:

a first isolated coupler having an input and an output, wherein said input of said first isolated coupler is coupled to said transmit signal, and said output of said first isolated coupler is coupled to said analog loop;

a second isolated coupler having an input and an output, wherein said input of said second isolated coupler is coupled to said transmit signal, and said output of said second isolated coupler is coupled to a summing node;

a third isolated coupler having an input and an output, wherein said input of said third isolated coupler is coupled to said analog loop, and said output of said third isolated coupler is coupled to said summing node;

wherein at least one of the isolated coupler is an opto-coupler said summing node configured to produce said receive signal based on the difference between said output of said third isolated coupler and said output of said second isolated coupler.

4. The method of claim 1 or 2, wherein said transmit signal comprises negative and positive differential output currents.

5. The method of claim 1 or 2, wherein said receive signal comprises negative and positive differential output currents.

6. The method of claim 1 or 2, further including the step of providing impedance balancing within said analog loop.

7. The transceiver of claim 3, wherein said first isolated coupler is selected from the group consisting of: an opto-coupler, a capacitor, and a transformer.

8. The transceiver of claim 3, wherein said second isolated coupler is selected from the group consisting of: an opto-coupler, a capacitor, and a transformer.

9. The transceiver of claim 3, further including a impedance balancing network coupled to said analog loop.

10. The transceiver of claim 3, wherein said first isolated coupler and said second isolated coupler are opto-couplers sharing a common light-emitting diode coupled to said transmit signal.

11. A method of ADSL echo cancellation comprising:

generating, via an isolated coupler, a current on a telephone loop equal to $i_{txp}$, where $i_{txp}$ is a differential transmit current;

receiving, via an isolated coupler, a current from said telephone loop equal to $i_{txp}+i_{rxp}$, where $i_{rxp}$ is a differential receive current present on said telephone loop;

producing, via an isolated coupler comprising an opto-coupler, a current equal to $-i_{txp}$;

producing a summed signal equal to $(i_{txp}+i_{rxp})+(-i_{txp})$.

12. A method of providing echo cancellation and isolation comprising:

generating a transmit signal within an analog loop;

receiving a composite signal from said analog loop corresponding to the sum of said transmit signal and a receive signal;

inverting an isolated transmit signal using an isolated coupler comprising a photodiode and a photodetector; and providing said receive signal based on the sum of said inverted isolated transmit signal and said composite signal.

* * * * *